United States Patent

[11] 3,576,228

| [72] | Inventor | John T. Kasselmann |
| | | Southfield, Mich. |
| [21] | Appl. No. | 792,238 |
| [22] | Filed | Jan. 16, 1969 |
| [45] | Patented | Apr. 27, 1971 |
| [73] | Assignee | The Bendix Corporation |

[54] STEERING SYSTEM FOR LAND VEHICLES
24 Claims, 8 Drawing Figs.

[52] U.S. Cl. ..................................... 180/79.2, 137/81.5
[51] Int. Cl. ........................................ B62d 5/08
[50] Field of Search........................... 180/79.2, 79.1; 244/78, 77 (M); 114/144, 150; 137/81.5

[56] References Cited
UNITED STATES PATENTS

| 2,865,462 | 12/1958 | Milliken et al. | 180/79.2 |
| 2,902,104 | 9/1959 | Schilling | 180/79.2 |
| 2,904,120 | 9/1959 | Bidwell | 180/79.2 |
| 2,987,135 | 6/1961 | Harvey | 180/79.2 |
| 3,011,579 | 12/1961 | Milliken et al. | 180/79.2 |
| 3,254,864 | 6/1966 | Kent et al. | 244/78 |
| 3,456,752 | 7/1969 | Fonda | 180/79.2 |

*Primary Examiner*—Kenneth H. Betts
*Assistant Examiner*—John A. Pekar
*Attorneys*—William L. Anthony, Jr. and Plante, Arens, Hartz, Smith & Thompson

ABSTRACT: A fluidic steering system for automobiles and the like to automatically compensate for lateral disturbances having a fluid rate sensor for providing a sensor signal representative of course deviations, a fluidic circuit for providing a generated signal in response to driver steering commands which is representative of expected course deviations due to the steering commands, and a fluidic circuit to sum the sensor and generated signals thereby providing a net signal which is representative of the automatic steering control necessary to maintain the vehicle on a desired course.

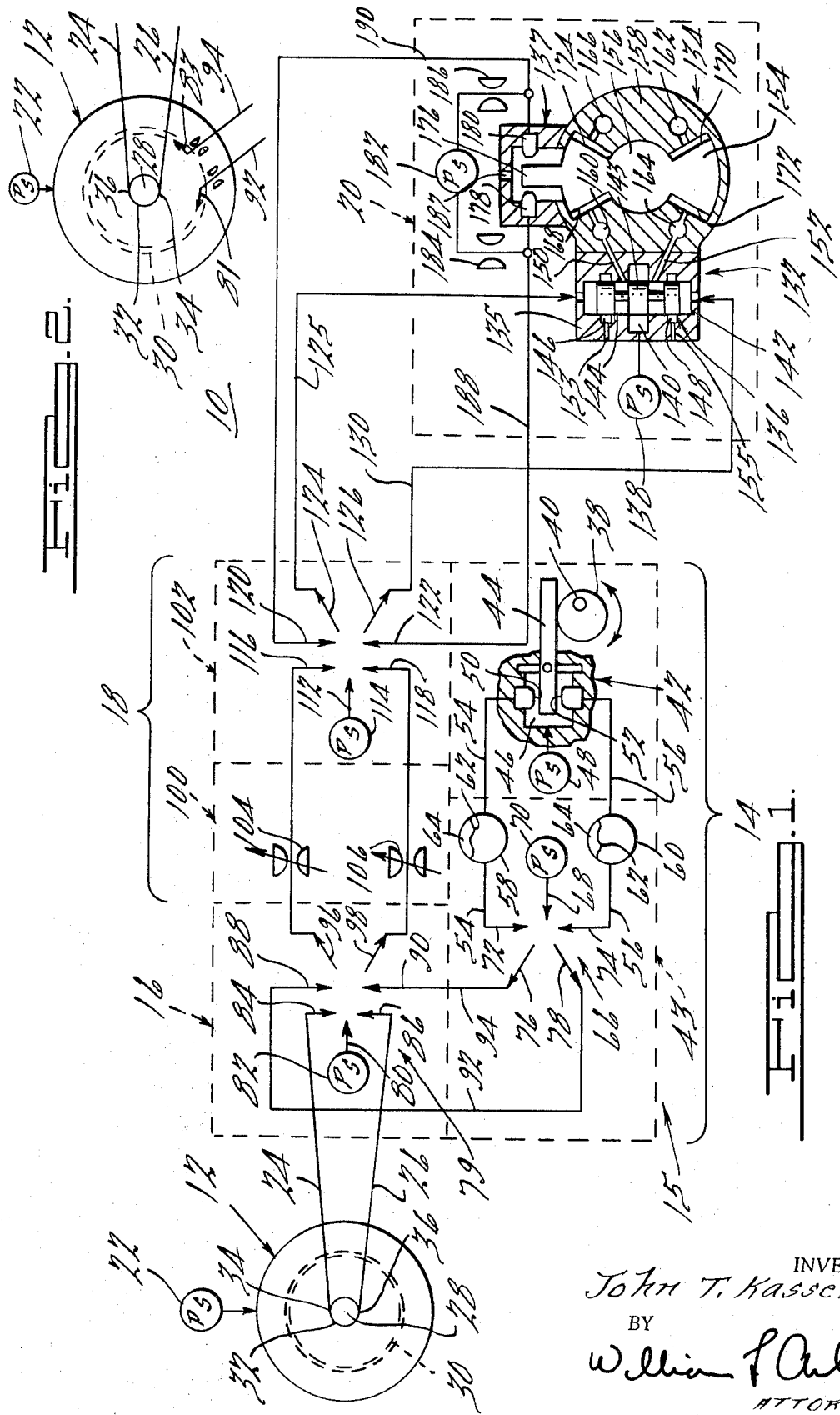

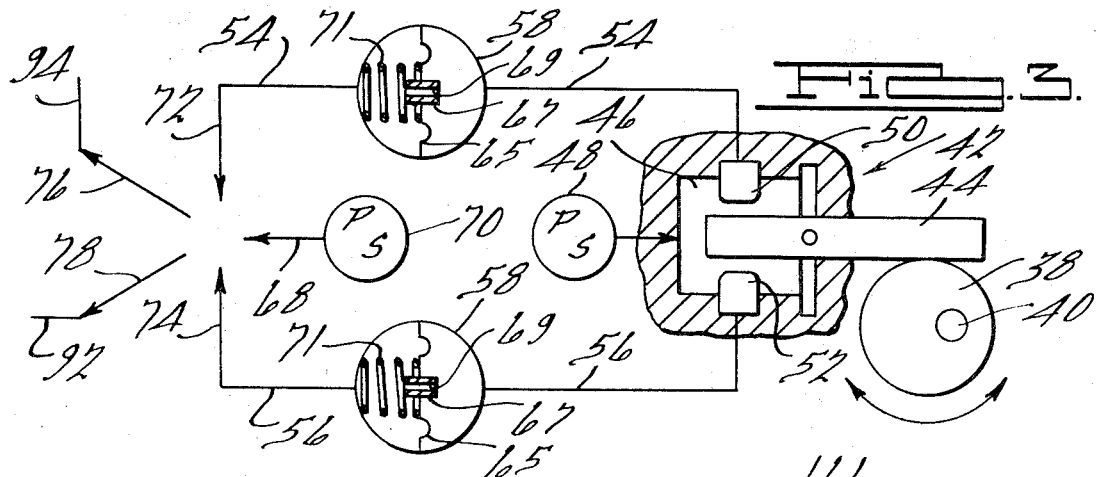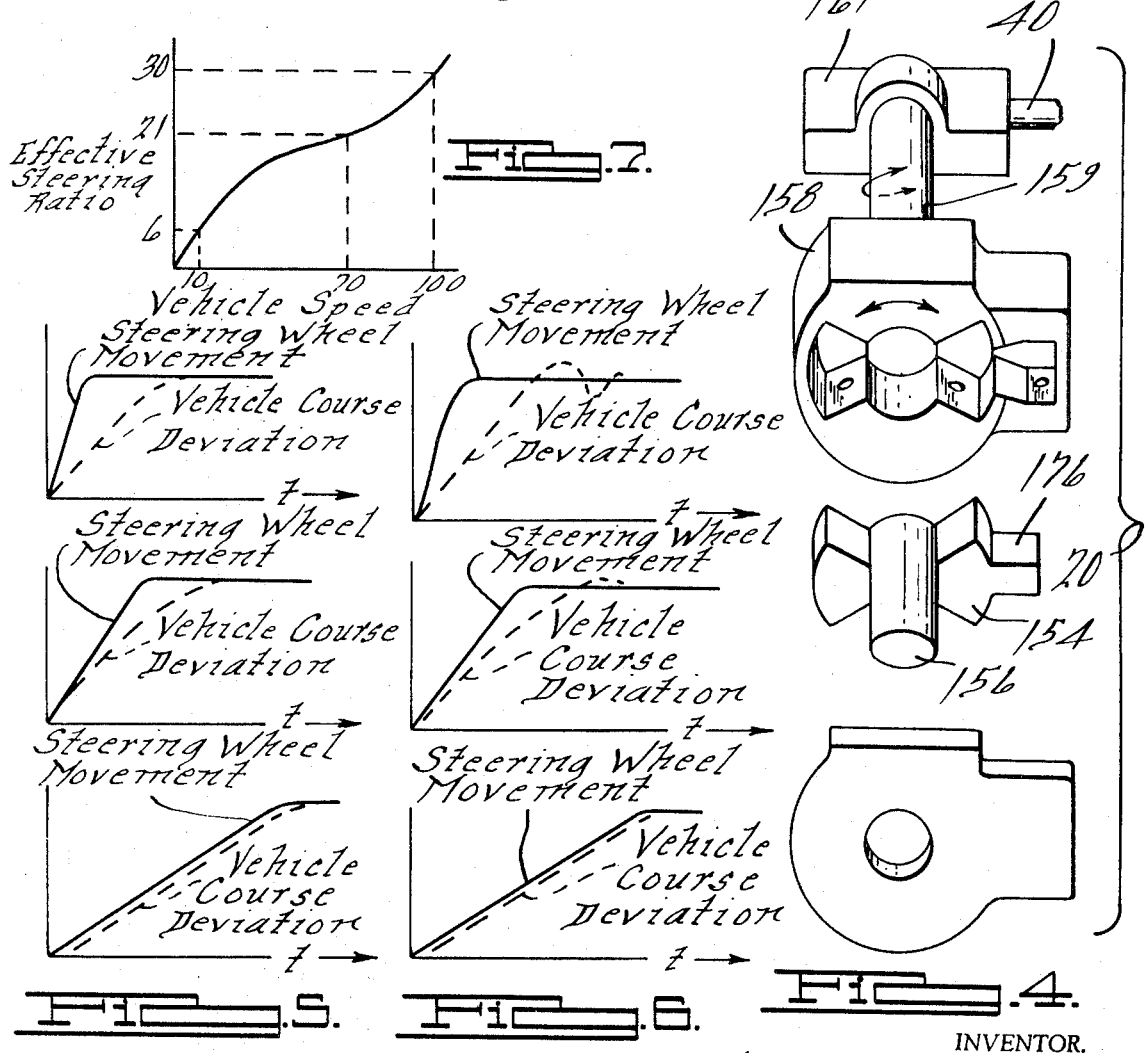

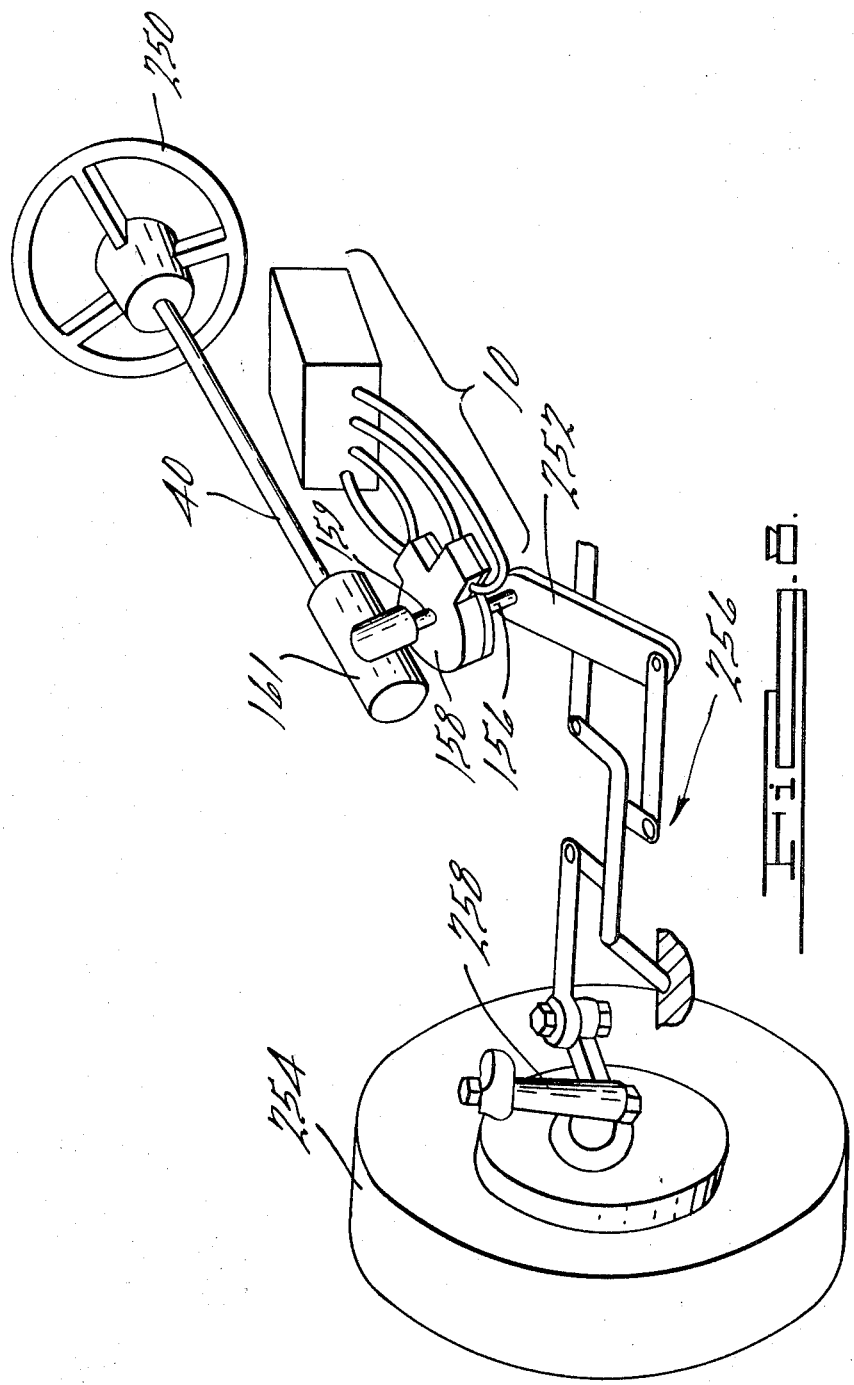

STEERING SYSTEM FOR LAND VEHICLES

CROSS REFERENCE TO RELATED APPLICATIONS

This application relates to an improvement over the device disclosed in the application of Lael B. Taplin and Jerome G. Rivard for "A Fluidic Automobile Steering System which Automatically Compensates for Wind Gusts and the Like," Ser. No. 792,904 filed Jan. 15, 1969 and the application of Jerome G. Rivard for "A Fluidic Automobile Steering System which Automatically Compensates for Wind Gusts and the Like," Ser. No. 792,243 filed Jan. 16, 1969.

BACKGROUND OF THE INVENTION

1. Field of the Invention

Steering systems for land vehicles and more particularly a fluidic steering system for automatically compensating for lateral disturbances such as wind gusts and road irregularities.

2. Description of the Prior Art

Prior art lateral disturbance compensating systems electrically sense course deviations of a land vehicle and utilize an electrical signal representative thereof as a supplement to the steering commands. However, the prior art systems do not provide means for effectively distinguishing between course deviations due to lateral disturbances such as wind gusts and course deviations due to driver steering commands. In this regard, it will be appreciated that the course deviations of the vehicle in response to driver commands will result in a sensed signal which is indistinguishable from a signal resulting from an external lateral disturbance. Accordingly, a steering command will cause a sensed signal which in turn will cause a steering correction tending to nullify the steering command at least to some degree. This effect is a serious drawback in prior art systems.

In the U.S. Pat. No. 2,987,135, to Harvey, it is taught to utilize an electrical signal representative of the difference between the actual course deviation of the vehicle and the product of steering wheel movement and the speed of the vehicle as the automatic course correction signal for the vehicle. However, this system would be ineffective in maintaining the true desired course of a vehicle since it does not account for the dynamic response characteristic of the vehicle. For example, the actual turning rate of a vehicle does not vary linearly as a function of the steering movement. Rather, the actual turning rate of a vehicle depends upon the dynamic response characteristic of the vehicle as well as the steering wheel movement. Therefore, it will be appreciated that prior art systems provide automatic steering corrections which are only approximate. Accordingly, some driver correction, in some circumstances substantial driver correction, is required to maintain the intended course of the vehicle when the vehicle encounters a lateral disturbance. It will further be appreciated that inaccuracies in steering correction may cause the vehicle to overrespond to a lateral disturbance. Under these conditions, the driver correction must aid rather than oppose the lateral disturbance to maintain the desired course of the vehicle. The driver, therefore, is required to react in an abnormal manner which would create confusion and establish a hazardous condition. It is possible to reduce the sensitivity of this prior art system such that under any conditions the system will not overreact to a lateral disturbance. However, this compromise will correspondingly reduce the sensitivity in the normal operating range thereby requiring substantial driver correction for the normally encountered lateral disturbances, which requirement is contrary to the objectives of an automatic lateral disturbance compensating system.

SUMMARY OF THE INVENTION

The present invention provides a novel automatic lateral disturbance compensating system for land vehicles which effectively distinguishes between course deviations of the vehicle due to lateral disturbances and course deviations due to driver steering corrections. As a result, the steering system of the present invention has no significant nullifying effect on driver steering commands. This is accomplished by providing a circuit responsive to driver steering commands for generating a signal determined in part by the dynamic response characteristic of the vehicle and in part by the magnitude of the steering commands which, therefore, is substantially representative of expected course deviations of the vehicle due to the steering commands. The generated signal is summed with a sensor signal representative of actual course deviations of the vehicle thereby providing a resultant signal representative of the course deviations due only to lateral disturbances. To accomplish these functions, a novel system using fluidic components is utilized.

It has been found that the generated signal must be based on the dynamic response characteristic of the vehicle, for example, the dynamic response characteristic is in part a function of the steering and the suspension geometry, the center of gravity, the weight distribution, the roll center of the vehicle, and other known factors. If these factors are not represented in the generated signal, the steering of the vehicle will be subject to continued variation during a turning maneuver even when the driver steering command does not change. A variance of the steering causes the movement of the vehicle to be unpredictable and hence creates a significant safety problem.

As a further advantage of the present system, variable-ratio steering as a function of speed is provided. Particularly, the compensating system of the present invention provides a decrease in effective overall steering ratio at low speeds and an increase in effective overall steering ratio at high speeds thereby providing "quick" steering at low speeds for ease of low speed maneuvering and "slow" steering at high speeds for finer control and corresponding greater safety during high speed operation.

BRIEF DESCRIPTION OF THE DRAWINGS

FIG. 1 is a schematic illustration of an automatic lateral disturbance compensating steering system according to this invention.

FIG. 2 is a schematic illustration of an apparatus for summing two signals which is an alternative to an apparatus for the same function shown in FIG. 1.

FIG. 3 is an illustration of a modified form of a signal generating circuit incorporated in the system shown in FIG. 1.

FIG. 4 is a perspective exploded illustration of an actuator shown in FIG. 1 as it may be incorporated in the steering system of an automobile.

FIG. 5 is a series of three charts illustrating the relationship between steering wheel movement and vehicle course deviation for a first vehicle example.

FIG. 6 is another series of three charts illustrating the relationship between steering wheel movement and vehicle course deviation for a second vehicle example.

FIG. 7 is a chart illustrating a variable ratio steering effect on the main steering system of the automatic compensating system shown in FIG. 1.

FIG. 8 is a perspective view of an automobile steering system incorporating the lateral disturbance compensating system of FIG. 1.

DETAILED DESCRIPTION OF THE PREFERRED EMBODIMENT

Apparatus

In FIG. 1, a steering system for a land vehicle such as an automobile or the like is shown incorporating an automatic compensating system 10 according to this invention for compensating for lateral disturbances. The system 10 comprises a fluidic rate sensor 12 for providing a sensor signal representative of course deviations of the vehicle, a fluidic circuit 14 for generating a signal in response to driver steering commands determined in part by the dynamic response characteristic of the vehicle and in part by the magnitude of the steering commands which, therefore, is substantially representative of expected course deviations of the vehicle due to the driver commands, a fluidic circuit 16 for summing the generated signal and the sensor signal thereby providing a net signal representative of the course deviations of the vehicle due to lateral disturbances, an amplifying circuit 18 for receiving the output signal of the summing circuit 16, and an limited authority actuator 20 responsive to the amplified signal from circuit 18 to provide steering corrections for the vehicle to compensate for lateral disturbances.

The fluidic rate sensor 12 may be a vortex device which receives pressurized fluid from a source 22, and upon lateral course deviations of a vehicle, will generate a differential pressure between lines 24 and 26 which is representative of the direction and amount of angular velocity of the vortex rate sensor 12 about its axis 28. Vortex devices of this nature are well known in the art and are illustrated in U.S. Pat. No. 3,351,080 and application Ser. No. 547,595, assigned to the assignee of this invention. For one example, the rate sensor 12 may have a vortex chamber 29 including a porous element 30 through which supply fluid passes to an axial outlet opening 32. Rotational motion of the vortex rate sensor 12, produced by a course deviation of the vehicle, is imparted to the supply fluid by the porous element 30 thereby causing vortical flow in the device which may be measured at the outlet opening 32. One device for measuring vortical flow at the outlet opening consists of a pair of tangentially oriented pickoff tubes 34 and 36 positioned near the outlet opening 32, each of the tubes receiving a portion of the vortical flow. It can be seen from FIG. 1 that a rotational flow in the clockwise direction will cause a pressure rise at pickoff 34 and a pressure drop through aspiration at pickoff 36. Consequently, a pressure differential is created between lines 24 and 26 with the higher pressure being in line 24. It can also be seen that a counterclockwise flow will cause a pressure rise at pickoff 36 and a pressure drop at pickoff 34 thereby creating a pressure differential between lines 24 and 26 with the higher pressure in line 26.

As will be appreciated by those skilled in the art, other devices are available to sense course deviations of a vehicle. For example, rate and acceleration sensors, both angular and rectilinear, may be incorporated into this invention singularly or in combination. In this regard, course deviations which may be sensed include any variance from an intended course such as rotation of the vehicle about a vertical axis (yaw) or lateral movement (side shift).

The fluidic circuit 14 for generating a signal which is substantially representative of expected course deviations of the vehicle due to steering commands includes a flapper valve 42 operated by a cam 38 which rotates with steering shaft 40. A shaping circuit 43 received the output from the flapper valve 42. Particularly, the flapper valve 42 comprises a pivotally mounted flapper valve arm 44, a plenum chamber 46 communicating with a source 48 of fluid at elevated pressure, and a pair of outlet ports 50 and 52 in the chamber 46 disposed on opposite sides of the flapper arm 44 such that pivotable movement of the flapper arm in response to rotations of the cam 38 by the steering shaft 40 provides variable proportioning of the flow from the chamber 46 through the exhaust ports 50 and 52. It will be understood that the valve 42 may be operated in response to steering commands through various other mechanisms. A pair of flow lines 54 and 56 are connected to exhaust ports 50 and 52, respectively. In view of the above, it will be appreciated that driver steering commands create differential flows through lines 54 and 56 to circuit 43 in response to the direction and the magnitude of the steering commands.

The circuit 43 comprises a pair of variable volumes 58 and 60 which are interposed in lines 54 and 56 respectively. In the case of incompressible fluids, the volumes 58 and 60 are provided with flexible diaphragms 62 which provide a closed space for containing a compressible medium 64 which, for example, may be air. In the case of compressible fluids such as air, flexible diaphragms 62 are not necessary. Considering now a fluid signal represented by changes in the flow rate differential between fluid lines 54 and 56, it will be appreciated that the volumes 58 and 60 cause a transient delay of the fluid signal passing therethrough. The transient delay of the fluid signal may be mathematically expressed as a first order function. That is, the fluid signal leaving the volumes 58 and 60 is a first order function of the signal on lines 54 and 56. The first order function may be varied by adjusting the size of the volumes 58 and 60. For example, the amount of transient delay may be increased by increasing the size of the volumes 58 and 60, and visa versa.

In some vehicle installations, a circuit providing a second order function may be desired. A circuit providing a second order function is shown in FIG. 3. The circuit of FIG. 3 includes volumes 58 and 60 each having a diaphragm 65 dividing the volumes into two portions. A weight 67 mounted on each diaphragm has an orifice 69 therein providing a flow passage between the two portions. Each diaphragm is resiliently loaded by a spring 71 positioned between the diaphragm and a wall of the volume. The weights 67 provide an inertia effect whereas the springs 71 cause lateral oscillations of the diaphragms.

It will be appreciated that a fluid signal provided on line 54 or 56 by virtue of a driver steering command will move the diaphragm 65 to the left thereby forcing fluid out of the left portion of the volume 58 or 60, respectively. In addition, a fluid flow occurs by virtue of the orifice 69. When the diaphragm has reached full movement towards the left, the spring 71 will push the diaphragm 65 and the weight 67 back towards the right which will superimpose a reverse flow on to the flow through the orifice 69. The net flow will always be towards the left since the orifice is sized such that the flow therethrough is the greater flow. The diaphragm 65 will continue to laterally oscillate thereby superimposing an oscillatory fluid flow on to the flow through the orifice 69. This oscillation is affected, as explained below, by the inertia characteristic of the weight 67. Both flows are modified by the effects of the volume 58 or 60, i.e. a transient delay is introduced. The end result is that the flow out of the volumes 58 and 60 are related by a second order function to the flows entering the volumes 58 and 60.

The spring constant of springs 71 and the mass of weights 67 may be varied to adjust the amplitude and frequency of oscillation. Particularly, the frequency of oscillation is related to:

$$\sqrt{\frac{\text{spring constant of springs 71}}{\text{mass of weights 67}}}$$

assuming the diaphragm has a negligible mass and spring constant. Therefore, increasing the spring constant increases the frequency and increasing the mass decreases the frequency. Moreover, the amplitude of oscillation is primarily dependent upon the fluid force applied to the diaphragm (i.e. the differential pressure across the diaphragm by virtue of a driver steering command), the inertia effect of the weights 67 (i.e. the mass of weights 67), and the spring constant of springs 71. For example, the fluid force on the diaphragm is related to both the magnitude of the steering commands and the size of orifice 69 such that greater magnitude of the steering commands or smaller orifice size results in a greater pressure differential across the diaphragm 65 and correspondingly greater amplitudes of oscillation. Also, lower spring rates provide greater amplitudes of oscillation for a given force. The effect of mass on amplitude of oscillation depends on the rate of change of driver steering commands. Particularly, weights 67 having lower masses will provide greater amplitudes of oscillation for steering commands of high rates of change. At low rates of change of the steering commands, the inertia effect of weights 67 is less significant. Also, the diameter of the orifice 69 may be varied to control the total flow through the volumes 58 and 60. Using generally the criteria described above, the shape of the second order function may be controlled as desired.

The examples of fluidic shaping circuit shown above are only two of many circuits which may be used to establish virtually any functional relationship between an input signal and an output signal. The actual functional relationship and hence the circuit and values of its components are generally determined empirically according to criteria stated herein.

The circuit 43 of FIG. 1 also includes a proportional jet-on-jet device 66 for amplifying the signal from volumes 58 and 60. Jet-on-jet devices of this nature are well known in the art. Particularly, the proportional jet-on-jet device 66 includes a supply passage 68 connected to a source 70 of pressurized fluid, a pair of control ports 72 and 74 connected to fluid lines 54 and 56, respectively, and a pair of output channels 76 and 78. As will be understood by those skilled in the art, a higher flow rate through the control port 72, than through the control port 74 will provide an amplified flow rate which is proportionately higher in output channel 78 than in the output channel 76.

The summing circuit 16 includes a proportional jet-on-jet device, indicated generally at 79. The device 79 has a supply port 80 connected to a source 82 of pressurized fluid, a first pair of control ports 84 and 86 connected to the vortex rate sensor 12 by lines 24 and 26, a second pair of control ports 88 and 90 connected by fluid lines 92 and 94 to the output channels 76 and 78 respectively of the signal generating system 14, and a pair of output channels 96 and 98. It will be appreciated by those skilled in the art that the supply flow from supply port 80 will be diverted to output channel 96 in response to a flow from either control port 86, control port 90, or both, and further that the supply flow will be diverted to output channel 98 in response to a flow from either control port 84, control port 88 or both. The device described herein is a proportioning device, and therefore, the amount diverted to one or the other output channels depends upon the relative amounts of flow from the control ports. Moreover, opposing flows from control ports on opposite sides of the device will have a net effect which is proportional to the difference in their flows. That is to say, if the flow from control port 86 is greater than the flow from control port 88, the supply flow from supply port 80 will be diverted to output channel 96 in proportion to the difference between the flows from control ports 86 and 88. On the other hand, if the flow from each of the control ports are equal, the flows through the output channels 96 and 98 will be equal and therefore the net signal from the device 79 will be zero. Accordingly, the summing circuit modulates the output signal from the vortex rate sensor 12 according to the generated signal to provide an output signal on channels 96 and 98 will represent the sum of the two signals.

It will be appreciated by those skilled in the art that other means are available to modulate the output signal from the vortex rate sensor according to the generated signal to thereby sum the two signals. For example, the output signal from the signal generating circuit 14 may be introduced into the vortex chamber as a vortical flow inducing control signal as shown in FIG. 2. Particularly, a pair of control ports 81 and 83 communicate with the vortex chamber 85 of the rate sensor 12 interiorly of the porous element 30. As can be seen in FIG. 2, each port communicates tangentially in opposite directions to effect the vortical flow in the vortex chamber 85 oppositely, i.e. the port 81 will tend to induce vortical flow in the clockwise direction, and conversely, the port 83 will tend to induce vortical flow in the counterclockwise direction. These control port induced vortical flows will be superimposed on any course deviation induced vortical flows. In this manner, the signals from the signal generating system 14 will be summed with sensed course deviations thereby providing an output signal from the vortex rate sensor which represents the desired sum.

The amplifying circuit 18 comprises a gain-adjust circuit 100 and an amplifying circuit 102. The gain-adjust circuit 100 comprises a pair of variable restrictions 104 and 106. It will be appreciated by those skilled in the art that the elements 104 and 106 are used to adjust the amplitude of a fluid signal passing therethrough thereby tailoring the automatic compensating system 10 to the particular vehicle and vehicle model in which it is mounted.

The amplifier circuit 102 is a jet-on-jet proportional device having a supply port 112 connected to a source 114 of pressurized fluid, a pair of control ports 116 and 118, a pair of feedback ports 120 and 122 and a pair of output channels 124 and 126 connected to output lines 125 and 130. It will be appreciated that the output signal on output channels 124 and 126 is a function of the control signal flow through control ports 116 and 118 and a feedback flow through feedback ports 120 and 122. To facilitate the teaching of the present invention, the feedback system will be considered inoperative at the present time. It will be understood then that the net output signal from the summing circuit 16 is amplified by the amplifying circuit 102 to produce an amplified output signal on flow lines 125 and 130.

The limited authority actuator 20 is adapted to be interposed in the vehicle main steering system, for example, as shown in FIG. 8 to provide steering corrections supplemental to the operator steering commands. The actuator 20 comprises a spool valve 132, an actuator output portion 134 and a feedback system 137.

The spool valve 132 comprises a housing 135 and a spool 136 being axially movable therein in response to fluid signals on amplifier circuit output lines 96 and 98. A source 138 of pressurized supply fluid communicates with a central supply chamber 140 formed by the housing 135. The spool 136 is provided with lands 142, 143 and 144 cooperating with the walls of housing 135. A pair of annular return chambers 146 and 148 are formed in the housing 135 having return passages 153 and 155 respectively, communicating therewith. For example, the return passages 153 and 155 may be connected to a supply reservoir by suitable flow lines (not shown). The housing 135 is further provided with a pair of output passages 150 and 152 having openings between the return chambers and the supply chambers. Spool valves of this construction are well known in the art and therefore only a brief description of the operation of the spool valve 132 will follow. Assuming that the fluid flows and consequently the pressure in the lines 96 and 98 are equal, the spool 136 will be balanced in a central position thereby positioning the spool lands 142, 143 and 144 to prevent any substantial flow between the output passages 150 and 152, and either the supply chamber 140 or the return chambers 146 and 148. If, however, there is a differential flow between the lines 96 and 98 because the course of the vehicle has been laterally disturbed, a differential pressure is established across the spool 136 which causes it to move in one direction, communicating one of the output passages 150 or 152 to the supply chamber 140 thereby allowing flow from the source 138 of supply fluid to the selected one of the output passages 150 and 152. Moreover, the above movement of the spool 136 communicates the other of the output passages to the corresponding return passage 153 and 155.

The output passages 150 and 152 of spool valve 132 communicate with the actuator output portion 134 which comprises a housing 158 and a rotatable member 154 therein fixedly connected to the actuator output shaft 156. As shown in FIG. 1, the circular sides of the rotatable member 154 cooperate with the walls of the housing 158 to form a substantial fluid seal therewith. The operating relationship of the housing 158, the rotatable member 154 and the actuator output shaft 156 may be more easily seen in the exploded view of these components in FIG. 4.

The actuator output portion 134 responds to fluid signals from output passages 150 and 152. Particularly, a housing 158 is provided with a pair of ports 160 and 162 connected by a passage not shown, communicating with the spool valve output passage 150 and is further provided with a pair of ports 164 and 166, also connected by a passage not shown, communicating with the spool valve output passage 152. As can be seen in FIG. 1, a pressure in the line 150 causes a corresponding pressure against the sides 168 and 170 of the rotatable member 154 causing clockwise rotation of that member whereas a pressure in the line 152 causes a pressure against the sides 172 and 174 of the rotatable member 154 causing counterclockwise rotation. The rotation of the rotatable member 154 causes corresponding rotation of the actuator output shaft 156.

In FIG. 1, it can be seen that the rotatable member 154 is provided with an integral extension 176, and a pair of flow nozzles 178 and 180 positioned on opposite sides of the extension 176. The nozzles 178 and 180 communicate with a source 182 of pressurized fluid through a pair of restrictions 184 and 186, respectively. The housing 158 is provided with a return passage 187 for egress of fluid from nozzles 184 and 186. The return passage 187 may be connected to a supply reservoir. It will be appreciated that the rotation of the rotatable member 154, and the consequent movement of the extension 176 with respect to the nozzles 178 and 180, causes a variation in the pressure immediately upstream of the nozzles 178 and 180 due to a variation in the flow restriction at the nozzle. The pressure immediately upstream of the nozzles 178 and 180 is transmitted to the lines 188 and 190, respectively, thereby causing a variable rate of fluid flow through these lines from the source 182 which is representative of the position of extension 176, and accordingly, the position of the actuator output shaft 156. The flow signals in the lines 188 and 190 communicate with the feedback ports 122 and 120, respectively, of the proportional amplifying device 102.

As can be seen in FIG. 4, the housing 158 of the limited authority actuator output portion 134 is connected to the output shaft 159 of the main steering unit 161 for rotation therewith. It will be appreciated then that the housing 158 rotates in response to driver steering commands. The rotatable member 154 and consequently the actuator output shaft 156 are allowed limited rotary movement with respect to housing 158 by virtue of their configuration as shown in FIG. 1. The actuator output shaft 156 is connected to the dirigible wheels for turning of the vehicle.

The operative relationship between the actuator output shaft 156 and the dirigible wheels may be more clearly seen with reference to FIG. 8 in which a steering system for a land vehicle is shown having a steering wheel 250 for control of the vehicle by the operator, a steering shaft 40 connecting the steering wheel 250 with a main steering unit 161. Operator commands are transmitted through the main steering unit 161 to the main steering output shaft 159, and in turn to the limited authority actuator housing 158. The limited authority actuator output shaft 156 is connected to a Pitman arm 252 for rotation thereof. The Pitman arm 252 is connected to the dirigible wheels 254 (one not shown for clarity) through suitable known steering linkage 256 for turning of the wheels 254 about the pivotal axes of the uprights 258, and consequently, steering of the vehicle. Although this invention is described with respect to a conventional steering apparatus for an automobile, it will be appreciated it can be equally applied to other methods for steering land vehicles.

In view of the above, it will be appreciated that driver steering commands are transmitted from the main steering unit output shaft 159 through the limited authority actuator output portion 134 to the dirigible wheels 254. However, the limited relative rotation provided between actuator output shaft 156 and the housing 158 permits the introduction of lateral disturbance steering corrections. This relative rotation between the actuator output shaft 156 and the housing 158 is not transmitted back to the vehicle operator to any degree because of the low compliance of the steering train in the reverse direction. It will thus be appreciated that the dirigible wheels are steered by the sum of the operator steering commands and the course correction signals provided by automatic lateral disturbance compensating system 10. It will also be appreciated that the operator has a wide range of authority over vehicle steering whereas the lateral disturbance compensating system 10 has a substantially more limited authority by virtue of the configuration of rotatable member 154 and the actuator housing 158. However, the limited authority of the compensating system 10 is sufficient to correct course deviations due to lateral disturbances. By virtue of the limited authority of the lateral disturbance compensating system 10, erroneous steering corrections due to malfunctions of the system are easily overriden by operator steering commands.

As still an additional advantage to the steering system described herein, a mechanical link is provided between the steering wheel 250 and the dirigible wheels 254 in the event that the automatic compensating system 10 fails. Particularly, it will be appreciated that the maximum relative rotary movement between the actuator output shaft 156 and the main steering system output shaft 159 is limited to only a few degrees by the configuration of the actuator housing 158. When the relative movement between the two shaft reaches its maximum limit in either direction, the rotatable member 154 abuts against the actuator housing 158 thereby mechanically linking the shafts 159 and 156. Accordingly, a mechanical link is provided between the steering wheel 250 and the dirigible wheels 254 in the event of the failure of the lateral disturbance compensating system 10.

Operation

To facilitate the teaching of this invention, consider the case where a vehicle equipped with the automatic compensating system 10 is progressing on a straight course and does not encounter a lateral disturbance. Since the vehicle is being steered on a straight course, the steering input shaft 40 will be positioned such that cam 38 maintains the flapper valve arm 44 equidistantly between the flapper valve nozzles 50 and 52. As will be apparent from the earlier discussion with respect to the signal generating system 14, the flows through lines 54 and 56 and consequently the output signal from the signal generating system 14 will be zero under the above conditions. Since the vehicle is proceeding on a straight course and consequently there is no vehicle yaw, the output signal from the vortex rate sensor 12 will be zero and hence the flows through lines 24 and 26 are equal. Since the summing circuit 16 receives zero signals from both the vortex rate sensor 12 and the signal generating system 14, its output will also be zero and consequently the signal sent to the actuator 20 will be zero. It will be appreciated that the actuator output shaft 156 of the steering system actuator 20 will remain stationary and thus the automatic compensating system 10 will have no effect on vehicle steering. This, of course, is the desired result since the vehicle is not encountering a lateral disturbance.

Next, consider the case where the vehicle is being steered on a straight course and encounters a lateral disturbance such as a wind gust or a road irregularity. As described above, the steering input shaft will be positioned such that there is no signal from the signal generating system 15. However, the lateral disturbance will cause a vehicle course deviation or yaw motion of the vehicle which will be sensed by the vortex rate sensor 12. In response to the yaw motion, an output signal on lines 24 and 26 of the vortex rate sensor 12 will be provided which is representative of the direction of yaw motion and the yaw rate. The direction of yaw motion is represented by the fluid line, 24 or 26, which is contains the highest flow rate whereas the amount of yaw motion is represented by the differential rates of flow in fluid lines 24 and 26. The summing circuit 16 receives a signal from the vortex rate sensor 12 and no signal from the signal generating system 14. Consequently, the summing circuit 16 will provide an output signal which is proportional to the output signal on the lines 24 and 26 of the vortex rate sensor 12 which is accordingly proportional to the yaw rate of the vehicle. Appropriate modification of the output signal of the summing circuit 16 occurs in circuit 100 to yield an output signal which is substantially representative of the steering correction required to return the vehicle to its original course. This signal is amplified by circuit 102 and thereafter transmitted through the flow lines 125 and 130 to the actuator 20. The output signal on the fluid lines 125 and 130 is essentially a difference of flow rates in the lines. The difference in flow rates is applied to opposite ends of the spool 136 thereby creating a differential pressure across the spool 136 and corresponding movement of the spool towards the side of lower pressure. This movement exposes the selected one of the output passages 146 and 148 to the supply pressure in the inlet chamber 140 causing flow into the selected passage from the source 142. Flow into these fluid passages, as explained above, rotates the actuator output shaft 156 in a preselected direction to provide supplemental steering of the vehicle. The extension 176 moves with the shaft 156 to provide a flow differential between flow lines 188 and 190 corresponding to the amount of actual steering correction. The flow differential in the lines 188 and 190 is applied to the amplifier 102 as a feedback signal. It will be appreciated that these feedback signals oppose the input signal to the amplifier 102 in proportion to the actual movement of the actuator steering output shaft 156 thereby providing accurate position control of the shaft 156. Further, the feedback signal serves to return the actuator output steering shaft 156 to the neutral position when no correction signal is received by amplifier 102.

Consider now the case in which the vehicle negotiates a turn and the vehicle does not encounter a lateral disturbance. By virtue of the driver command on the steering wheel, the steering input shaft 40 will be turned such that cam 38 positions flapper valve arm 44 nonequidistantly between the exhaust ports 50 and 52 thereby providing a differential flow rate between the flow lines 54 and 56 corresponding to the amount of rotation of the steering input shaft 40 and accordingly to the amount of the driver steering command. The flow signal in the lines 54 and 56 is modified by circuit 43 to provide a signal on lines 92 and 94 which approximates the expected yaw rate of the vehicle due to the steering command of the driver. The need to modify the flow signal in the lines 54 and 56 will be apparent in view of the charts of FIGS. 5 and 6 which compare various steering wheel movements with the resulting course deviation, each FIG. illustrating the relationship for a particular vehicle. It can be seen from the charts of FIGS. 5 and 6 that a vehicle, by virtue of its dynamic response characteristic, does not respond instantaneously to steering wheel movement nor does it always follow steering wheel movements at an identical rate when it does respond. For this reason, a signal which is directly proportional to steering wheel movement will not substantially represent the expected course deviation of the vehicle and consequently will not approximate the yaw rate experienced by the vehicle.

Referring now to the shaping circuit 43 of FIG. 1 and the corresponding shaping circuit of FIG. 3, the lag between actual yaw rate and the steering command for the vehicle examples of FIGS. 5 and 6, respectively, is approximated by the volumes 58 and 60 which cause transient delay in the rate of change of fluid signals passing through them. The amount of delay can be adjusted, for example, by increasing the size of volumes 58 and 60 to increase the transient delay, and visa versa. It can also be seen from the charts of FIGS. 5 and 6 that the time lag between steering wheel movement and vehicle response increases as the rate of steering wheel movement increases. This effect is also approximated by the volumes 58 and 60.

The type of circuit to be used and the specifications of the components of the circuit depend upon the dynamic response characteristic of the vehicle in which the automatic compensating system 10 is mounted.

For example, the dynamic response characteristic of some vehicles may be suitably represented by a first order function, that is, the series of curves shown in the charts of FIG. 5 closely represent the relationship between various steering wheel movements with the resulting course deviations. Accordingly, a signal generating circuit 14 along the lines of FIG. 1 may be used. However, the dynamic response characteristic of some vehicles, particularly those with highly compliant suspensions and low shock absorber rates, are more suitably represented by a second order function. In that case, a circuit such as that shown in FIG. 3 may be used to provide a generated signal substantially representative of expected yaw rate due to driver steering commands as illustrated in the charts of FIG. 6. It can be seen from the charts of FIG. 6 that the second order function is essentially characterized by an oscillation superimposed on a first order function. This oscillation is caused by suspension compliance and lack of critical shock absorber dampening on some automobiles. It is approximated in the generating circuit of FIG. 3 by the provision of weights 67 and the springs 71.

The operation of the generating circuit 14 with respect to the present example in which the vehicle is negotiating a turn in response to the driver steering command without a lateral disturbance can now be better understood. It will be appreciated that the vehicle will experience a yaw rate. The vortex rate sensor 12 senses the yaw rate and provides an output signal on the lines 24 and 26 which is representative thereof. Since there is no lateral disturbance, the yaw rate represented by the signal on lines 24 and 26 will be a product only of the driver steering command. Moreover, since the signal from the generating circuit 14 approximates the yaw rate of the vehicle due to the driver steering command, it is approximately equal to the signal from the vortex rate sensor 12. These two signals are placed in opposition in the summing circuit 16 thereby cancelling the substantially equal signals. Consequently, the output signal from the summing circuit 16 will be approximately zero. Since the output signal from the summing circuit 16 is zero, no signal will be sent to the supplemental steering system actuator 20 and thus the automatic compensating system output shaft 156 will remain stationary. It will then be appreciated that in the case of a driver induced turn without a lateral disturbance, the automatic compensating system 10 will have no effect on the steering of the vehicle.

Consider now the case where the vehicle negotiates a turn and encounters a lateral disturbance. As explained above, the signal generating system 14 will provide a generated signal on the output lines 92 and 94 which is substantially representative of the expected yaw rate of the vehicle due to the driver's steering commands. It will be appreciated that there will be a course deviation on the vehicle due to the lateral disturbance, and in addition, there will be a course deviation due to the turning motion of the vehicle. These two components of course deviation may either add or subtract to produce a net course deviation. The vortex rate sensor 12 will provide an output signal on the output lines 24 and 26 which is representative of the net course deviation of the vehicle. Therefore, the output signal from the vortex rate sensor 12 can be considered to have two components, a component representative of the course deviation due to the driver steering command and a component representative of the course deviation due to the lateral disturbance. The summing circuit 16 opposes the generated signal representing expected course deviation such that the component of the output signal of the vortex rate sensor 12 which is representative of the course deviation of the vehicle due to the driver steering command is effectively cancelled by the generated signal. Consequently, the output signal of the summing circuit 16 represents only the component of the output signal of the vortex rate sensor 12 which is indicative of the course deviations of the vehicle due to the lateral disturbance. The output signal of the summing circuit 16 is modified and amplified by circuit 18 and in turn causes rotation of the actuator steering output shaft 156 to provide corrective steering of the vehicle. It will be appreciated that the driver steering command is transmitted through the actuator output portion 134 such that the steering correction from the lateral disturbance compensating system are summed with driver steering commands.

The compensating system 10 of this invention advantageously varies the effective steering ratio of the entire vehicle steering system as a function of speed for small order steering corrections. Particularly, the steering wheel movement necessary to make a turn of a given radius at low speed is less than a conventional steering system and the steering wheel movement necessary to make a turn of a given radius at low speed is less than a conventional steering system and the steering wheel movement necessary to make a turn of a given radius at high speed is greater than a conventional steering system. This relationship may be seen in the chart of FIG. 7 wherein the relationship between effective steering ratio and vehicle speed is shown for a typical installation of the compensating system of this invention.

This variable ratio feature of this invention will be understood if it is first considered that the yaw rate of the vehicle varies as a function of vehicle speed as well as the turning radius. Particularly, for a given turning radius, the yaw rate will increase as the vehicle speed increases. This relationship between the yaw rate and the vehicle speed is accounted for in the system of this invention by a design factor which optimizes the response of the system for a given vehicle speed. The system preferrably is optimized for speeds commonly used in freeway travel, for example, 70 m.p.h. At the design speed, the signal from the generating circuit 14 is precalibrated to be substantially equal to the signal from the vortex rate sensor 12. At speeds other than the design speed, there is a differential between the signals from the generating circuit 14 and the vortex rate sensor 12 which provides the variable ratio steering effect shown in the chart of FIG. 7. Particularly, a given steering wheel movement will provide a generated signal from generating circuit 14 which is smaller than the yaw rate signal from rate sensor 12 for speeds above the designed speed by virtue of the increase in yaw rate due to the increase in speed and correspondingly, the same movement will provide a generated signal which is smaller than the yaw rate signal for speeds lower than the designed speed by virtue of the decrease in the yaw rate to the decrease in vehicle speed. Accordingly, at speeds above the design speed, the differential signal from the rate sensor 12 will tend to cancel a portion of the steering command provided by the driver thereby reducing the response of the vehicle. As a result, the effective steering ratio is increased. At speeds below the design speed, the differential signal from the generating circuit 14 will tend to assist the driver steering command thereby increasing the response to the vehicle. As a result, the effective steering ratio of the vehicle is reduced. These relationships are shown in the chart of FIG. 7 for a vehicle having a design speed of 70 m.p.h. and a main steering system steering ratio of 21 to 1. As can be seen from the chart, the effective steering ratio is increased by the steering system according to this invention above 70 m.p.h. to reduce the responsiveness of the car to steering corrections and is decreased below 70 m.p.h. to increase the responsiveness of the car to steering corrections. It has been a goal of automotive engineers for many years to provide a steering system having quick response to driver commands for ease of movement at low speeds and yet does not provide dangerously high sensitivity at high speeds. This goal is effectively and simply provided by the steering system of this invention.

In view of the above description, it will be appreciated that the steering system according to the present invention provides increased convenience and safety over steering systems of the prior art. Furthermore, the present steering system utilizes fluidic components which may be economically fabricated and are reliable in operation. In addition, this system may be used with a variety of actuators and therefore can be conveniently incorporated with existing steering system designs.

While I have described preferred embodiments of the present invention, it should be understood that various changes, adaptations and modifications may be made therein without departing from the spirit of the invention and the scope of the appending claims.

I claim:

1. A steering apparatus for a vehicle which automatically compensates for lateral disturbances comprising:
   means for steering said vehicle in response to operator commands;
   a sensor associated with said vehicle and adapted to provide a sensor signal representative of course deviations of said vehicle;
   generator means generating a signal in response to said operator commands substantially corresponding to the actual steering movement of said vehicle in response to said commands;
   means for modulating said sensor signal by said generator means signal to provide a modulated signal which is substantially representative of the course deviations of said vehicle due only to lateral disturbances; and
   means associated with said last means for effecting the steering of said vehicle according to said modulated signal.

2. The apparatus of claim 1 wherein said generator means includes means generating said signal as a first order function of the magnitude of said steering commands.

3. The apparatus of claim 1 wherein said generator means includes means generating said signal as a second order function of the magnitude of said steering commands.

4. The steering apparatus of claim 1 wherein said modulating means comprises:
   summing means connecting said generating means directly with said sensor for modulating the output signal therefrom according to said generated signal.

5. A steering apparatus for a vehicle which automatically compensates for lateral disturbance comprising:
   means for steering said vehicle in response to operator commands;
   a fluidic sensor mounted on said vehicle and adapted to provide a sensor fluid signal representative of course deviations of said vehicle;
   generator means generating a signal in response to said operator commands substantially corresponding to the actual steering movement of said vehicle in response to said commands;
   means for modulating said sensor signal by said generator means signal to provide a modulated fluid signal which is substantially representative of course deviations of said vehicle due only to lateral disturbances; and
   means associated with said last means for effecting the steering said vehicle according to said modulated signal.

6. The apparatus of claim 5 wherein said sensor is a vortex rate sensor.

7. The apparatus of claim 5 wherein said generator means includes means generating said signal as a first order function of the magnitude of said steering commands.

8. The apparatus of claim 5 wherein said generator means includes means generating said signal as a second order function of the magnitude of said steering commands.

9. The steering apparatus of claim 5 wherein said modulating means comprises:
   means receiving said sensor fluid signal and said generated signal for providing an output signal representative of the sum of said signals.

10. The steering apparatus of claim 5 wherein said modulating means comprises:
    summing means connecting said generating means directly with said sensor for modulating the output signal therefrom according to said generated signal.

11. The apparatus of claim 5 wherein said generator means includes cam means responsive to the magnitude of said steering commands and valve means operative in response to said cam means for providing a fluid flow representative of the magnitude of said steering commands.

12. The apparatus of claim 11 wherein said generator means further includes volume means for modifying said fluid flow representative of the magnitude of said steering commands according to the actual response of said vehicle to said steering commands.

13. The apparatus of claim 12 further including resilient diaphragm means in said volume means for dividing said volume means into two portions, a flow passage for said fluid flow representative of the magnitude of said steering commands through said diaphragm means, and a weight attached to said diaphragm means such that said flow through said passage is modified by oscillation of said diaphragm.

14. A steering apparatus for a vehicle comprising:
input means for providing steering commands;
vortex rate sensing means mounted on said vehicle for providing a pair of output fluid signals representative of course deviations of said vehicle;
means operative in response to said steering commands for generating a pair of fluid signals determined in part by the dynamic response characteristic of said vehicle and in part by the magnitude of said steering commands which are substantially representative of expected course deviations of said vehicle due to said steering commands;
a proportioning fluidic device having a supply passage for flow of a supply fluid, two output channels for egress of said supply fluid, a first pair and a second pair of control ports, one port of each pair for diverting said supply flow into one of said output channels, and the other port of each pair for diverting said supply flow into the other of said output channels, said one port of said first pair of control ports receiving one output signal of said vortex rate sensing means and said other port of said first pair of control ports receiving the other output signal of said vortex rate sensing means, said one port of said second pair of control ports receiving one of said generated signals and said other port of said second pair of control ports receiving the other of said generated signals in a manner such that said signals from said vortex rate sensing means are opposed by said signals from said signal generating means; and
means associated with said fluidic device for effecting the steering of said vehicle according to relative flows from said output channels.

15. The apparatus of claim 14 wherein said means generating said fluid signals includes means generating said signals as first order functions of the magnitude of said steering commands.

16. The apparatus of claim 14 wherein said means generating said fluid signals includes means generating said signals as second order functions of the magnitude of said steering commands.

17. The apparatus of claim 14 wherein said signal generating means includes:
cam means responsive to the magnitude of said steering commands; and
valve means operative in response to said cam means to provide a pair of valve means output fluid signals.

18. The apparatus of claim 17 wherein said means for providing said generated fluid signals includes a pair of volume means each for modifying one of said valve means output fluid signals.

19. The apparatus of claim 18 further including resilient diaphragm means in each of said volume means for dividing each of said volume means into two portions, flow passage means through said diaphragm means, and a weight attached to each of said diaphragm means such that flow through said passage means is modified by oscillation of said diaphragms.

20. A steering apparatus for a vehicle comprising:
input means for providing steering commands;
fluidic sensor means mounted on said vehicle for providing a sensor fluid signal representative of course deviations of said vehicle;
valve means operative in response to the magnitude of said steering commands for providing a fluid signal representative thereof;
modifying means including volume means for receiving said fluid signal representative of the magnitude of said steering commands and modifying said signal according to the dynamic response characteristic of said vehicle to provide a generated fluid signal which is substantially representative of expected course deviations of said vehicle due to said steering commands;
means associated with said fluidic sensor means and said modifying means for providing an output signal representative of the sum of said sensor fluid signal and said generated fluid signal; and
actuator means associated with said last means for effecting the steering of said vehicle according to said last means output signal.

21. The apparatus of claim 20 wherein said modifying means includes means modifying said signal as a first order function of said signal representative of the magnitude of said steering commands.

22. The apparatus of claim 20 wherein said modifying means includes means modifying said signal as a second order function of said signal representative of the magnitude of said steering commands.

23. The steering apparatus of claim 20 wherein said modifying means includes means for connecting said signal generating means with said sensing means in a manner such that said fluidic sensor means receives said modifying means generated fluid signal and provides an output fluid signal representative of said sum of said sensor fluid signal and said modifying means generated fluid signal.

24. The apparatus of claim 20 further including resiliently mounted diaphragm means in said volume means for dividing said volume means into two portions, a flow passage through said diaphragm means, and a weight attached to said diaphragm means such that flow through said passage is modified by oscillation of said diaphragm.